United States Patent
Al-Otaibi et al.

(10) Patent No.: US 10,047,275 B2
(45) Date of Patent: Aug. 14, 2018

(54) HYDROCARBON RECOVERY USING COMPLEX WATER AND CARBON DIOXIDE EMULSIONS

(71) Applicant: Saudi Arabian Oil Company, Dhahran (SA)

(72) Inventors: Fawaz M. Al-Otaibi, Alkhobar (SA); Sunil Kokal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 132 days.

(21) Appl. No.: 14/958,660

(22) Filed: Dec. 3, 2015

(65) Prior Publication Data

US 2016/0160116 A1 Jun. 9, 2016

Related U.S. Application Data

(60) Provisional application No. 62/087,625, filed on Dec. 4, 2014.

(51) Int. Cl.
*C09K 8/594* (2006.01)
*E21B 43/16* (2006.01)

(52) U.S. Cl.
CPC ............ *C09K 8/594* (2013.01); *E21B 43/164* (2013.01); *E21B 43/166* (2013.01); *C09K 2208/10* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 4,846,276 A | 7/1989 | Haines | |
| 5,033,547 A | 7/1991 | Schievelbein | |
| 5,465,790 A | 11/1995 | McClure et al. | |
| 5,758,727 A | 6/1998 | Moulu et al. | |
| 7,303,006 B2 | 12/2007 | Stone | |
| 2011/0226471 A1* | 9/2011 | Wattenbarger | C09K 8/58 166/263 |
| 2014/0284057 A1* | 9/2014 | Champagne | C09K 8/602 166/305.1 |

FOREIGN PATENT DOCUMENTS

| | | |
|---|---|---|
| WO | 2011152856 | 12/2011 |
| WO | 2012170835 | 12/2012 |

(Continued)

OTHER PUBLICATIONS

International Search Report and Written Opinion of the International Searching Authority issued in International Application No. PCT/US2015/063630 dated Mar. 8, 2016; 11 pages.

(Continued)

*Primary Examiner* — Jeffrey Washville
(74) *Attorney, Agent, or Firm* — Fish & Richardson P.C.

(57) ABSTRACT

In one aspect, a method of recovering hydrocarbons from a subterranean zone includes flowing carbon dioxide in a first state into the subterranean zone including hydrocarbons, wherein a density of the carbon dioxide in the first state is greater than a density of carbon dioxide in a gaseous state, and recovering at least a portion of the hydrocarbons in the subterranean zone in response to flowing carbon dioxide in the first state into the subterranean zone.

16 Claims, 4 Drawing Sheets

(56) References Cited

FOREIGN PATENT DOCUMENTS

WO    2013048860    4/2013
WO    2014075061    5/2014

OTHER PUBLICATIONS

Surguchev et al., "Screening of WAG Injection Strategies for Heterogeneous Reservoirs", SPE 25075, Copyright 1992, 12 pages.
Mirkalaei et al., "Investigation of Different I-WAG Schemes toward Optimization of Displacement Efficiency", Society of Petroleum Engineers, SPE-144891, Copyright 2011, 12 pages.
Kane et al., "Performance Review of a Large-Scale CO2-WAG Enhanced Recovery Project, SACROC Unit—Kelly-Snyder Field", Society of Petroleum Engineers, SPE-7091, Feb. 1979, 15 pages.
Chen et al., "Optimal Parametric Design for Water-Alternating-Gas (WAG) Process in a CO2-Miscible Flooding Reservoir", JCPT, Society of Petroleum Engineers, SPE-141650, vol. 49, No. 10, Oct. 2010, 8 pages.

\* cited by examiner

HYDROCARBON RECOVERY USING COMPLEX WATER AND CARBON DIOXIDE EMULSIONS

TECHNICAL FIELD

This disclosure relates to recovery of hydrocarbons from subterranean zones.

BACKGROUND

Many techniques can be used to recover hydrocarbons from a subterranean zone. For example, primary techniques can use the natural pressure of the subterranean hydrocarbons. Some secondary techniques use injections of water or other materials to increase the pressure of the subterranean hydrocarbons. Beyond primary and secondary techniques, tertiary techniques (also called "enhanced oil recovery techniques") can be used to recover hydrocarbons from subterranean zones. One type of technique includes the injection of materials into the subterranean zone to displace the hydrocarbons and facilitate recovery.

SUMMARY

This disclosure describes hydrocarbon recovery from subterranean zones. For example, the hydrocarbon recovery can be implemented using complex fluid and gas emulsions.

In some aspects, a method of recovering hydrocarbons from a subterranean zone includes flowing carbon dioxide in a first state into the subterranean zone, the carbon dioxide in the first state having a density greater than that of carbon dioxide in a gaseous state. The method also includes recovering at least a portion of the hydrocarbons in the subterranean zone in response to flowing carbon dioxide in the first state into the subterranean zone.

This, and other aspects, can include one or more of the following features. The carbon dioxide in the first state can include a first emulsion of water in carbon dioxide. The first emulsion of water in carbon dioxide can be stabilized using first particles that encapsulate the water. The carbon dioxide can surround the first particles. The first particles can include hydrophobic particles. The hydrophobic particles can include hydrophobic nano-particles. A concentration of the first particles can be between about 0.1% and 0.5% by weight. The first particles can include at least one of silica or calcite having a hydrophobic nature. The carbon dioxide in the first state can include a second emulsion of water in carbon dioxide in water. The second emulsion can include second particles surrounding the carbon dioxide surrounding the first particles. The second particles can include hydrophilic particles. The second emulsion can include second particles surrounding the carbon dioxide surrounding the first particles. The second particles can include hydrophilic particles. The second particles can include hydrophilic nano-particles. A concentration of the second particles can be between about 0.1% and 0.5% by weight. The second particles can include at least one of silica or calcite having a hydrophilic nature. The water can surround the second particles. Flowing carbon dioxide in the first state into the subterranean zone can include flowing carbon dioxide into the subterranean zone through a tubular. The method can include adding a corrosion inhibitor to the carbon dioxide in the first state to prevent corrosion of the tubular. The carbon dioxide in the first state can include a first emulsion of water in carbon dioxide, and a second emulsion of the first emulsion in water. Adding the corrosion inhibitor can include adding the corrosion inhibitor to the second emulsion. Flowing the carbon dioxide in the first state into the subterranean zone can enable producing more hydrocarbons relative to flowing the carbon dioxide in the gaseous state into the subterranean zone. A viscosity of the carbon dioxide in the first state can be greater than a viscosity of the carbon dioxide in the gaseous state. The density of the carbon dioxide in the first state can be sufficient to overcome a tendency of the carbon dioxide to rise toward a surface.

In some aspects, a method of recovering of recovering hydrocarbons from a subterranean zone includes flowing emulsified carbon dioxide into the subterranean zone including hydrocarbons, the emulsified carbon dioxide having a viscosity that is greater than a viscosity of carbon dioxide in a gaseous state.

This, and other aspects, can include one or more of the following features. The method can also include recovering at least a portion of the hydrocarbons in the subterranean zone in response to flowing the emulsified carbon dioxide into the subterranean zone. The emulsified carbon dioxide can include a first emulsion of water in carbon dioxide and a second emulsion of the first emulsion in water. The first emulsion of water in carbon dioxide can be stabilized using hydrophobic nano-particles that encapsulate the water. The carbon dioxide can surround the hydrophobic particles. The hydrophobic particles can include hydrophobic nano-particles. A concentration of the hydrophobic particles can be between about 0.1% and 0.5% by weight. The hydrophobic particles can include at least one of silica or calcite having a hydrophobic nature. The second emulsion can include hydrophilic particles surrounding the carbon dioxide surrounding the hydrophobic particles. The hydrophilic particles can include hydrophilic nano-particles. The hydrophilic particles can be between about 0.1% and 0.5% by weight. The hydrophilic particles can include at least one of silica or calcite having a hydrophilic nature. The water can surround the hydrophilic particles. Flowing the emulsified carbon dioxide into the subterranean zone can include flowing the emulsified carbon dioxide into the subterranean zone through a tubular. The method can include adding a corrosion inhibitor to the emulsified carbon dioxide to prevent corrosion of the tubular. Adding the corrosion inhibitor can include adding the corrosion inhibitor to the second emulsion. Flowing the carbon dioxide in the first state into the subterranean zone can enable producing more hydrocarbons relative to flowing the carbon dioxide in the gaseous state into the subterranean zone. A viscosity of the carbon dioxide in the first state can be greater than a viscosity of the carbon dioxide in the gaseous state. The density of the carbon dioxide in the first state can be sufficient to overcome a tendency of the carbon dioxide to rise toward a surface.

In some aspects, a method of recovering of recovering hydrocarbons from a subterranean zone includes flowing a composition into the subterranean zone including hydrocarbons. The composition includes a first emulsion of water in carbon dioxide and a second emulsion of the first emulsion in water. The method also includes recovering at least a portion of the hydrocarbons from the subterranean zone in response to flowing the composition into the subterranean zone.

This, and other aspects, can include one or more of the following features. Flowing the composition into the subterranean zone can include flowing the composition through a tubular into the subterranean zone, and wherein the composition further includes a corrosion inhibitor to prevent corrosion of the tubular. The corrosion inhibitor can be included in the second emulsion.

In some aspects, a composition includes a first emulsion of water in carbon dioxide and a second emulsion of the first emulsion in water.

This, and other aspects, can include one or more of the following features. The first emulsion of water in carbon dioxide can be stabilized using hydrophobic nano-particles that encapsulate the water. The carbon dioxide can surround the hydrophobic particles. The hydrophobic particles can include hydrophobic nano-particles. A concentration of the hydrophobic particles can be between about 0.1% and 0.5% by weight. The hydrophobic particles can include at least one of silica or calcite having a hydrophobic nature. The second emulsion can include hydrophilic particles surrounding the carbon dioxide surrounding the hydrophobic particles. The hydrophilic particles can include hydrophilic nano-particles. A concentration of the hydrophilic particles can be between about 0.1% and 0.5% by weight. The hydrophilic particles can include at least one of silica or calcite having a hydrophilic nature. The water can surround the hydrophilic particles.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
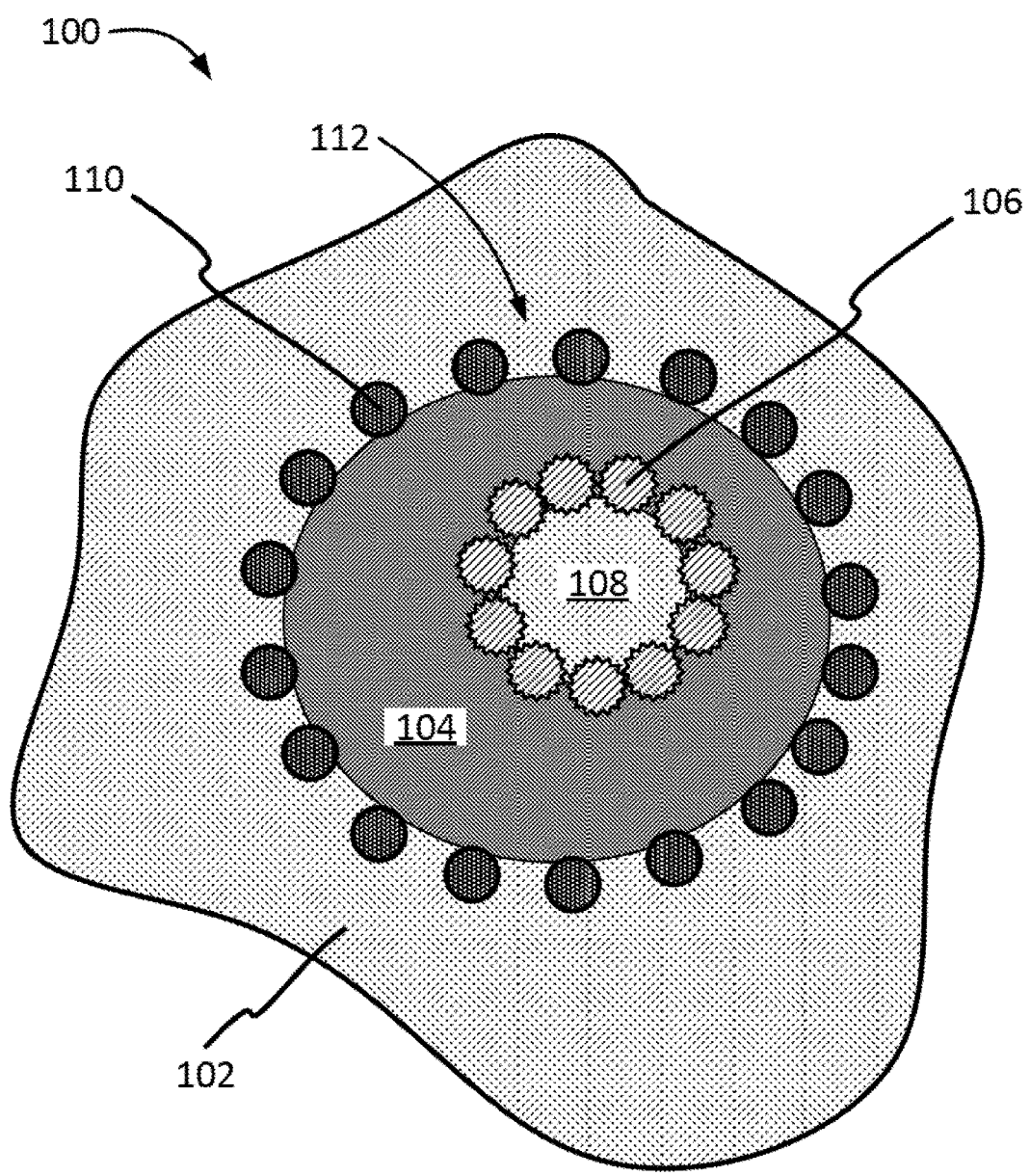
FIG. 1 is a schematic diagram of example emulsified carbon dioxide for flowing into a subterranean zone.

This disclosure relates to recovery of hydrocarbons from subterranean zones. An enhanced oil recovery ("EOR") technique sometimes used to recover hydrocarbons from a subterranean zone includes flowing a gas such as carbon dioxide ($CO_2$) into the subterranean zone. Another example EOR technique is the water-alternating-gas ("WAG") injection process. In a WAG process, water and a gas (e.g., $CO_2$) are alternately injected into the subterranean zone. The water and gas can facilitate recovery by displacing the hydrocarbons and improving hydrocarbon flow.

In some cases, achieving satisfactory overall recovery factor during tertiary or EOR mode using a gas (e.g., $CO_2$, nitrogen or hydrocarbon) can be challenging in reservoirs containing thief zones, fractures, and/or contrasting permeability layers. A WAG process can control gas segregation during hydrocarbon recovery using gas injection. However, the overall recovery factor using this process can be less than optimum in reservoirs or containing zones with high permeability streaks including fractures and contrasting permeable zones. Gravity override of the injected gas and fluid channeling through high permeability layers can produce poor sweep efficiency. In some cases, high amounts of gas slugs are needed during a regular WAG process. Additionally, these EOR processes can be associated with corrosion problems that can affect tubulars and other components.

This disclosure describes a hydrocarbon recovery process that uses an emulsified gas. For example, the gas can be $CO_2$. In some implementations, the emulsified gas is a fluid-gas-fluid complex emulsion. For example, the fluid can be water and the gas can be $CO_2$. In other implementations, the fluid is a fluid other than water and the gas is a gas other than $CO_2$, such as $N_2$, a hydrocarbon gas, or another gas. The complex emulsion is a modified fluid/gas emulsion to enhance the performance of EOR operations involving injection of gas. For example, the emulsified gas can be used in any tertiary process, EOR process, or WAG process that involves the injection of gas. An emulsified gas can have higher viscosity and higher density compared to the gas in a gaseous state. The higher density can reduce gas gravity override and overcome a tendency of the gas to rise toward the surface. In this manner, use of emulsified gas can control gas mobility and mitigate gravity override. The use of emulsified gas can reduce bypassed hydrocarbons (i.e., increase the ultimate hydrocarbon recovery), reduce gas fingering and water channeling, improve sweep efficiency and conformance, and reduce gas utilization factors (i.e., the amount of injected gas). In some cases, flowing the emulsified gas into a subterranean zone enables producing more hydrocarbons relative to flowing the gas in the gaseous state into the subterranean zone.

In some implementations, corrosion inhibitors can be added in the external fluid layer of the complex emulsion to mitigate downhole tubular corrosion. Some corrosion inhibitors are insoluble in certain gases, and thus some corrosion inhibitors cannot be added to gases (e.g., in an EOR gas injection) or emulsions in which the outer layer is gas. In this manner, the corrosion rate can be controlled through the use of corrosion inhibitors. Furthermore, more economical and efficient hydrocarbon recovery can be achieved with less corrosion issues.

FIG. 1 is a schematic diagram of an example emulsified gas 100 for flowing into a subterranean zone. Emulsified gas 100 includes an internal fluid-in-gas emulsion 112 that includes internal fluid 108 as an internal phase and gas 104 as an external phase. In some implementations, the internal fluid 108 is water, and the gas 104 is $CO_2$. The fluid-in-gas emulsion 112 is an internal phase of the fluid-in-gas-in-fluid emulsion 100, with external fluid 102 as the external phase. In some implementations, the external fluid 102 is water. The water can be distilled water, seawater, salinated water, or any other type of water. In some implementations, different types of fluid can be used for the external fluid 102 and the internal fluid 108. For example, water used as external fluid 102 can be at a different salinity than water used as internal fluid 108.

In the fluid-in-gas emulsion 112, the outer surface of each droplet of the internal fluid 108 is encapsulated by multiple first particles 106. The first particles 106 can stabilize the emulsified internal fluid 108 within the gas 104. The first particles 106 can be hydrophobic particles (e.g. hydrophobic nanoparticles or other hydrophobic particles), and can be a material such as silica, calcite, or another material. The first particles 106 can be used in any amount sufficient to create the fluid-in-gas emulsion 112. In some implementations, the first particles 106 have a concentration of 0.1-0.5 wt %. The fluid-in-gas emulsion 112, having an internal phase of fluid, can increase the density and viscosity of injected gas, thereby reducing the mobility of the gas through the subterranean zone. Increasing the density of injected gas can mitigate gravity override and improve the sweep efficiency of the gas injection. For example, at some reservoir conditions $CO_2$ viscosity is of the order 0.05 cP, compared with 1.0 cP for water and 0.8 cP for oil. This large difference in viscosities can cause unfavorable mobilities for the gas, as the gas can channel out. For example, the gas can channel horizontally for early breakthrough and channel vertically due to density difference, leaving a significant portion of the reservoir untouched. By increasing the viscosity of the gas-carrying medium, the gas can contact a larger portion of the subterranean zone, thus improving sweep efficiency and overall hydrocarbon recovery.

In the emulsified gas 100, the outer surface of each droplet of gas 104 is encapsulated by second particles 110. The second particles 110 can stabilize the emulsified gas 104 within the external fluid 102. The second particles 110 can be hydrophilic particles (e.g. hydrophilic nanoparticles or other hydrophilic particles), and can be a material such as silica, calcite, or another material. The second particles 110 can be used in any amount sufficient to create the emulsified gas 100. In some implementations, the second particles 110 have a concentration of 0.1-0.5 wt %. The external fluid 102 can supply the medium for adding corrosion inhibitors that help protect the downhole tubulars. Corrosion inhibitors can be added to the external fluid 102 and/or internal fluid 108. In some implementations, additives or substances other than corrosion inhibitors are added to the external fluid 102 and/or internal fluid 108. In this manner, the external fluid 102 can provide a medium for corrosion inhibitors or any other additives which are not soluble in gas.

Figure 2:
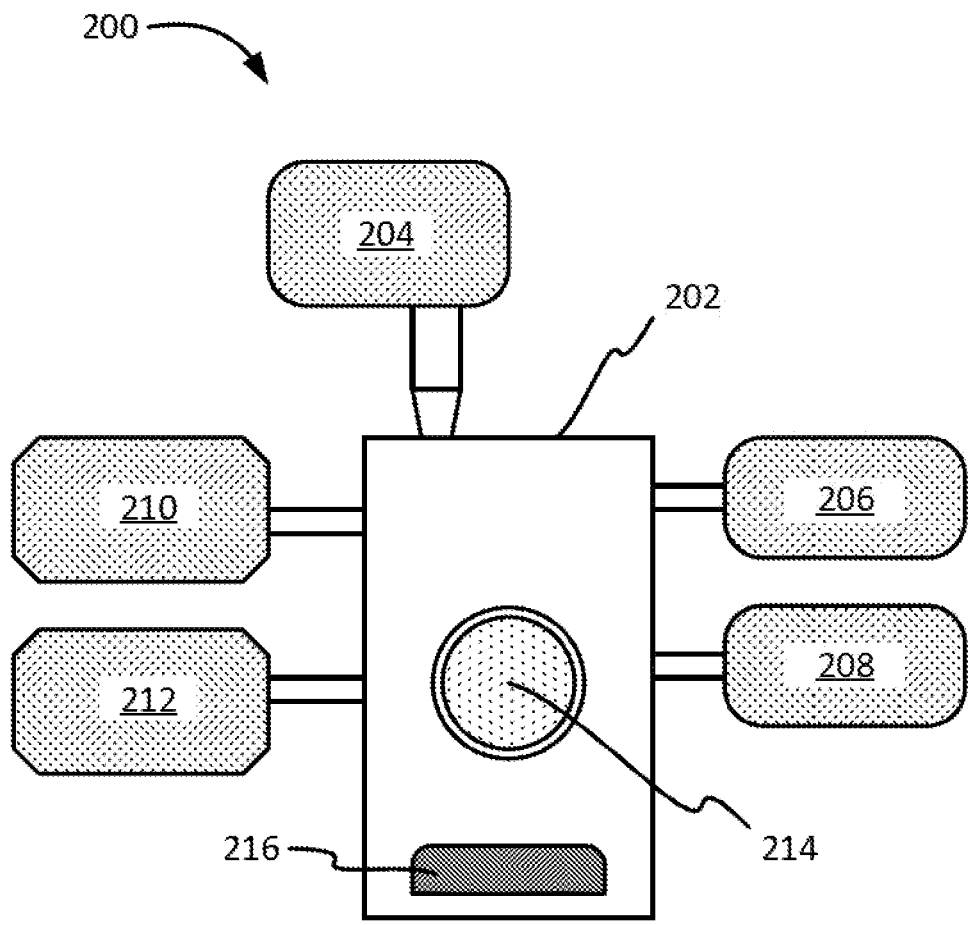
FIG. 2 is a schematic of an example system for manufacturing the emulsified carbon dioxide.

FIG. 2 is a schematic diagram of an example system 200 to manufacture an emulsified gas. System 200 includes a cell 202 that is connected to a gas supply 208 and a fluid supply 204. The cell 202 can also be connected to a first particle supply 210, a second particle supply 212, and an additive supply 206. The system 200 can include valves, piping, tubing, seals, fasteners, or other components that facilitate operation.

As an example implementation of system 200, the system 200 can be used to manufacture emulsified $CO_2$. For example, gas supply 208 can be a $CO_2$ supply and fluid supply 204 can be a water supply. Cell 202 can be connected to the $CO_2$ supply 208 and the water supply 204. Additionally, first particle supply 210 can be a hydrophobic particle supply, and second particle supply 212 can be a hydrophilic particle supply. The cell 202 can also be connected to the hydrophobic particle supply 210, the hydrophilic particle supply 212, and an additive supply 206. This is an example implementation; the system can be used to manufacture other types of emulsified gas.

The cell 202 can be a tank, chamber, container, vat, or other enclosure. For example, cell 202 can be a hollow metal cylinder. The cell 202 can be made of a metal such as aluminum or steel or other metal, or be made of another material. In some implementations, the cell 202 includes a blending device 216 such as a high-shear mixer or agitator to mix the contents of the cell 202. In some implementations, the cell 202 includes a window 214. Window 214 is a transparent window that allows the interior of the cell 202 to be seen. In some implementations, the cell 202 can control the temperature and/or pressure of the substances inside the cell 202.

The gas supply 208 supplies the gas used in the emulsion. The gas supply 208 can be a tank, vessel, chamber, Dewar, or other volume. The gas supply 208 can be integrated into the cell 202 (e.g., as an additional chamber) or be a separate component that is connected to the cell 202 (e.g., by piping). The gas supply 208 can contain gas in a pressurized state.

The fluid supply 204 can be a tank, vessel, chamber, well, pump, or other volume or source that can supply fluid to the cell 202. In some implementations, the fluid supply 204 holds a specific quantity (i.e., a premeasured amount) of fluid. The fluid supply 204 can be integrated into the cell 202 (e.g., as an additional chamber) or be a separate component that is connected to the cell 202 (e.g., by piping). In some implementations, the fluid supply 204 supplies fluid to the cell 202 at a measured rate. In some implementations, more than one fluid supply is connected to the cell 202 to supply more than one type of fluid.

The cell 202 can be connected to a first particle supply 210 that supplies a first type of particles to the cell 202. The cell 202 can also be connected to a second particle supply 212 that supplies a second type of particles to the cell 202. One or both of particle supplies 210, 212 can be a container, vessel, chamber, port, or other component that can supply the particles to the cell 202. In some implementations, the particle supplies 210, 212 hold a specific quantity (i.e., a premeasured amount) of particles. The particle supplies 210, 212 can be integrated into the cell 202 (e.g., as an additional chamber) or be a separate component that is connected to the cell 202 (e.g., by piping). In some implementations, the particles are added to the cell 202 before the cell 202 is sealed, heated, or pressurized. In some implementations, the particles are introduced into the cell 202 through an airlock or other transfer chamber. In this manner, the particles can be transferred to the cell 202 even if the cell 202 is heated or pressurized.

The additive supply 206 can be a tank, vessel, chamber, well, pump, or other volume or source that can supply additives (e.g., corrosion inhibitors or other additives) to the cell 202. In some implementations, the additive supply 206 holds a specific quantity (i.e., a premeasured amount) of additives. The additive supply 206 can be integrated into the cell 202 (e.g., as an additional chamber) or be a separate component that is connected to the cell 202 (e.g., by piping). In some implementations, the additive supply 206 supplies additives to the cell 202 at a measured rate.

Figure 3:
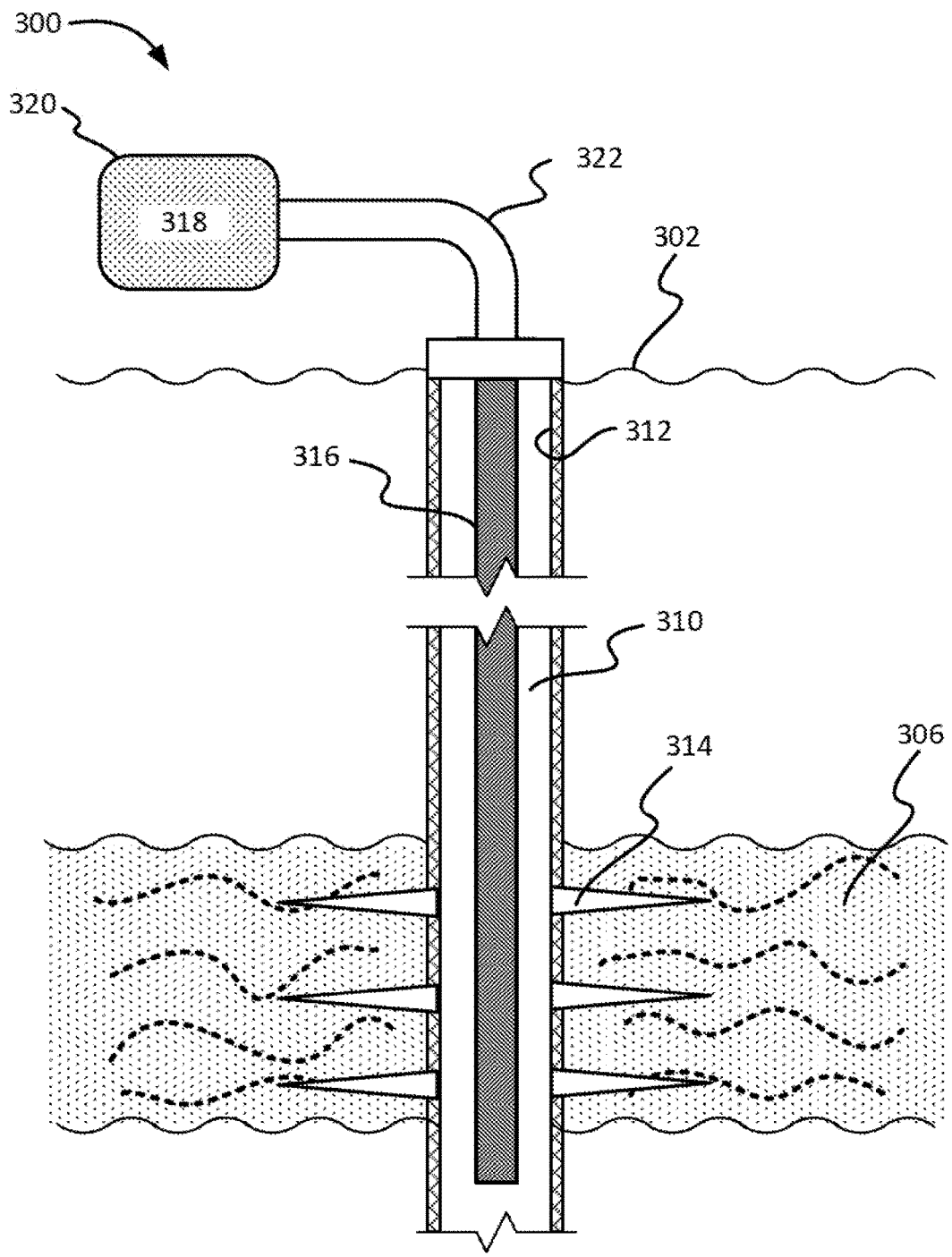
FIG. 3 is a schematic diagram of an example subterranean formation into which the emulsified carbon dioxide is flowed.

FIG. 3 is a diagram illustrating an example well system 300, including an example subterranean formation 306 into which emulsified gas is flowed. The well system 200 can flow emulsified gas (e.g., emulsified gas 100) into a subterranean formation 306, as described below. The example well system 300 includes a wellbore 310 below the terranean surface 302. In some implementations, the wellbore 310 is cased by a casing 312. A wellbore 310 can include any combination of horizontal, vertical, curved, and/or slanted sections.

The well system 300 includes a working string 316 that resides in the wellbore 310. The working string 316 terminates above the surface 302. The working string 316 can include a tubular conduit of jointed and/or coiled tubing configured to transfer materials into and/or out of the wellbore 310. The working string 316 can be in fluid communication with an emulsion supply 320 that supplies the emulsified gas 318. The emulsion supply 320 supplies emulsified gas 318 to the working string 316 via a transfer system 322 of conduits, tubulars, pumps, piping, and other related equipment. The working string 316 can communicate a fluid such as the emulsified gas 318 into or through a portion of the wellbore 310. In some implementations, the well system 300 includes multiple wellbores and multiple working strings.

The casing 312 can include perforations 314 in a subterranean region and the emulsified gas 318 can flow into a formation 306 through the perforations 314. The emulsified gas 318 can be used to recover hydrocarbons from formation 306. The emulsified gas 318 can be produced at the well system 300 site or produced off-site and transported to the well system 300 site. In some implementations, the emulsified gas 318 can be produced in a system like system 200 shown in FIG. 2. In instances where some or all of the wellbore 310 is left open in an "open hole configuration" coinciding with the formation 306, the emulsified gas 318 can flow through the open hole wall of the wellbore 310. Additionally, resources (e.g., oil, gas, and/or others) and other materials (e.g., sand, water, and/or others) may be extracted from the formation 306. The well system 300 can recover at least a portion of the hydrocarbons in the subterranean formation 306 in response to flowing the emulsified gas 318 into the subterranean formation 306. The casing 312 or the working string 316 can include a number of other systems and tools not illustrated in the figures.

Figure 4:
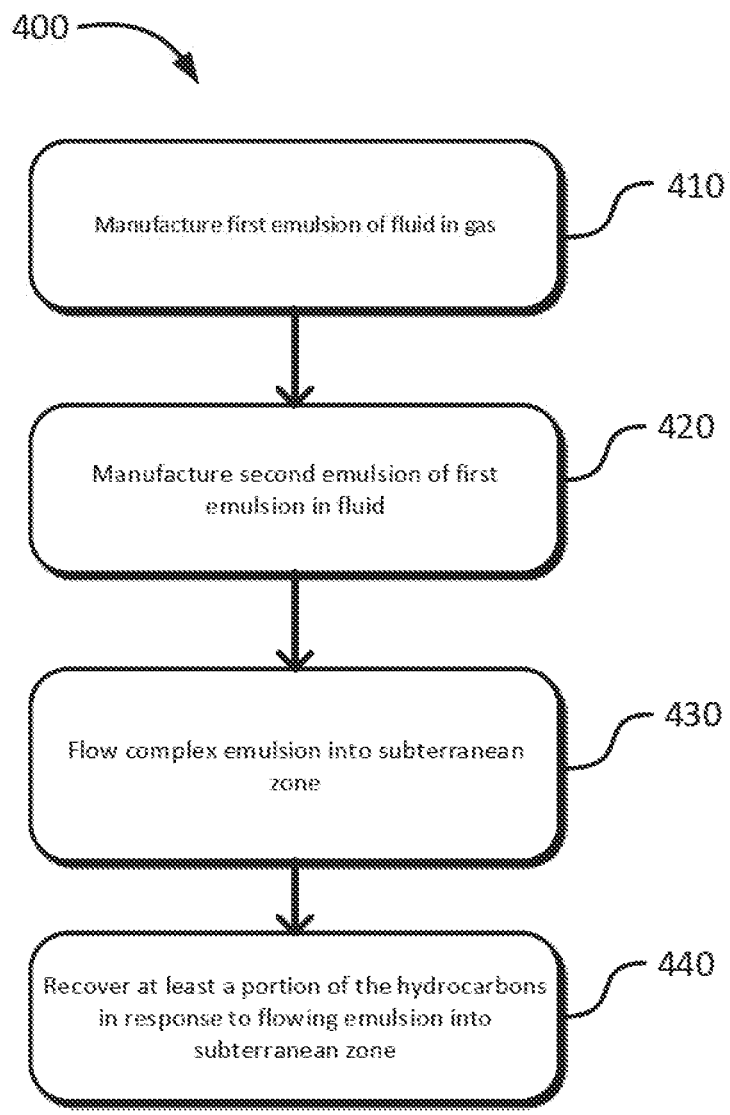
FIG. 4 is a flowchart of an example process for recovering at least a portion of hydrocarbons in a subterranean zone.

FIG. 4 is a flowchart of an example process 400 for recovering at least a portion of hydrocarbons in a subterranean zone. The process 400 can be implemented, for example, by an emulsified gas such as the fluid-gas-fluid-type emulsified gas 100, the emulsified gas manufacturing system 200, and the well system 300. At 410, a first emulsion of fluid-in-gas is manufactured using fluid, gas, and a first type of particles. For example, the first emulsion can be manufactured using example system 200 or another system. In some implementations, the first emulsion is manufactured by mixing water, $CO_2$, and hydrophobic particles. For example, a mixture of gas and particles can be agitated as the internal fluid is added at a measured rate. In some implementations, the first emulsion is manufactured at a first temperature and pressure. At 420, a second emulsion of the first emulsion in fluid is manufactured. For example, the second emulsion can be manufactured using example system 200 or another system. The second emulsion can be an emulsified gas, for example the fluid-gas-fluid emulsion described previously. In some implementations, the second emulsion is manufactured by mixing water, the first emulsion, and hydrophilic particles. For example, a mixture of the external fluid and particles can be agitated as the first emulsion is added at a measured rate. In some implementations, the second emulsion is manufactured at a second temperature and pressure. The second temperature and pressure can be the same or different than the first temperature and pressure. In some implementations, corrosion inhibitors or other additives are added to the second emulsion. In some implementations, the corrosion inhibitors or other additives are added to the fluid prior to mixing with the first emulsion and particles. Adding corrosion inhibitor can prevent corrosion of the tubular. At 430, the second emulsion is flowed into the subterranean zone. In some implementations, the second emulsion is flowed through a tubular into the subterranean zone. At 440, at least a portion of the hydrocarbons in the subterranean zone are recovered in response to flowing the second emulsion into the subterranean zone. In some cases, flowing the second emulsion into the subterranean zone enables producing more hydrocarbons relative to flowing carbon dioxide in the gaseous state into the subterranean zone.

Particular implementations of the subject matter have been described. Other implementations are within the scope of the following claims.

What is claimed is:

1. A secondary or tertiary hydrocarbon recovery method comprising:
flowing a complex emulsion into the subterranean zone, the complex emulsion comprising an internal fluid-in-gas emulsion configured to increase a density and a viscosity of a gas in the internal fluid-in-gas emulsion emulsifying a fluid in the internal fluid-in-gas emulsion, the complex emulsion comprising an external fluid emulsifying the internal fluid-in-gas emulsion, the external fluid configured to carry corrosion inhibitors into the subterranean zone, wherein the complex emulsion further comprises a first plurality of hydrophobic silica particles encapsulating an outer surface of droplets of the fluid in the internal fluid-in-gas emulsion, wherein a concentration of the first plurality of hydrophobic silica particles is between about 0.1% and 0.5% by weight; and
recovering at least a portion of hydrocarbons in the subterranean zone using the complex emulsion flowed into the subterranean zone.

2. The method of claim 1, wherein the fluid in the internal fluid-in-gas emulsion comprises water.

3. The method of claim 2, wherein the gas in the internal fluid-in-gas emulsion comprises carbon dioxide ($CO_2$).

4. The method of claim 1, wherein the complex emulsion comprises a second plurality of particles encapsulating an outer surface of droplets of the external fluid.

5. The method of claim 4, wherein the second plurality of particles comprise hydrophilic particles.

6. The method of claim 4, wherein the second plurality of particles comprise hydrophilic silica.

7. The method of claim 4, wherein a concentration of the second plurality of particles is between about 0.1% and 0.5% by weight.

8. The method of claim 1, wherein the complex emulsion further comprises corrosion inhibitors added to the external fluid.

9. The method of claim 1, wherein the complex emulsion is flowed into the subterranean zone in a secondary, tertiary or enhanced hydrocarbon recovery operation after a primary hydrocarbon recovery operation.

10. A secondary or tertiary hydrocarbon recovery method comprising:
manufacturing a complex emulsion comprising an internal fluid-in-gas emulsion configured to increase a density and a viscosity of a gas in the internal fluid-in-gas emulsion emulsifying a fluid in the internal fluid-in-gas emulsion, the complex emulsion comprising an external fluid emulsifying the internal fluid-in-gas emulsion, the external fluid configured to carry corrosion inhibitors into the subterranean zone, wherein the complex emulsion further comprises a first plurality of hydrophobic silica particles encapsulating an outer surface of droplets of the fluid in the internal fluid-in-gas emulsion, wherein a concentration of the first plurality of hydrophobic silica particles is between about 0.1% and 0.5% by weight;
flowing the complex emulsion into the subterranean zone; and
recovering at least a portion of hydrocarbons in the subterranean zone using the complex emulsion flowed into the subterranean zone.

11. The method of claim 10, wherein manufacturing the complex emulsion comprises mixing the gas in the internal fluid-in-gas emulsion, the fluid in the internal fluid-in-gas emulsion and the external fluid in a tank under controlled temperature and pressure.

12. The method of claim 11, wherein the complex emulsion further comprises a second plurality of particles encapsulating an outer surface of droplets of the external fluid, wherein manufacturing the complex emulsion comprises mixing the first plurality of particles and the second plurality of particles with the gas in the internal fluid-in-gas emulsion, the fluid in the internal fluid-in-gas emulsion and the external fluid in the tank.

13. The method of claim 12, wherein the first plurality of particles and the second plurality of particles are added to the tank after mixing the gas in the internal fluid-in-gas emulsion, the fluid in the internal fluid-in-gas emulsion and the external fluid.

14. The method of claim 11, wherein manufacturing the complex emulsion comprises first manufacturing the internal fluid-in-gas emulsion and then manufacturing the complex emulsion as an emulsion of the internal fluid-in-gas emulsion in the external fluid.

15. A complex emulsion for secondary or tertiary hydrocarbon recovery from a subterranean zone, the complex emulsion comprising:
   an internal fluid-in-gas emulsion configured to increase a density and a viscosity of a gas in the internal fluid-in-gas emulsion emulsifying a fluid in the internal fluid-in-gas emulsion; and
   an external fluid emulsifying the internal fluid-in-gas emulsion, the external fluid configured to carry corrosion inhibitors into the subterranean zone.

16. The complex emulsion of claim 15, further comprising:
   a first plurality of hydrophobic nanoparticles encapsulating an outer surface of droplets of the fluid in the internal fluid-in-gas emulsion; and
   a second plurality of hydrophilic particles encapsulating an outer surface of droplets of the external fluid.

* * * * *

UNITED STATES PATENT AND TRADEMARK OFFICE
CERTIFICATE OF CORRECTION

PATENT NO. : 10,047,275 B2
APPLICATION NO. : 14/958660
DATED : August 14, 2018
INVENTOR(S) : Fawaz M. Al-Otaibi et al.

Page 1 of 1

It is certified that error appears in the above-identified patent and that said Letters Patent is hereby corrected as shown below:

On the Title Page

Below Abstract, should read:
14 Claims, 4 Drawing Sheets

In the Claims

Please delete Claims 15 and 16, Column 10.

Signed and Sealed this
Ninth Day of July, 2019

Andrei Iancu
*Director of the United States Patent and Trademark Office*